May 12, 1942.  W. T. BARKER, JR  2,282,554
APPARATUS FOR AND METHOD OF REGULABLY CONTROLLING THE
TEMPERATURE OF MOLTEN GLASS IN FOREHEARTHS
Filed Nov. 1, 1939  2 Sheets-Sheet 1
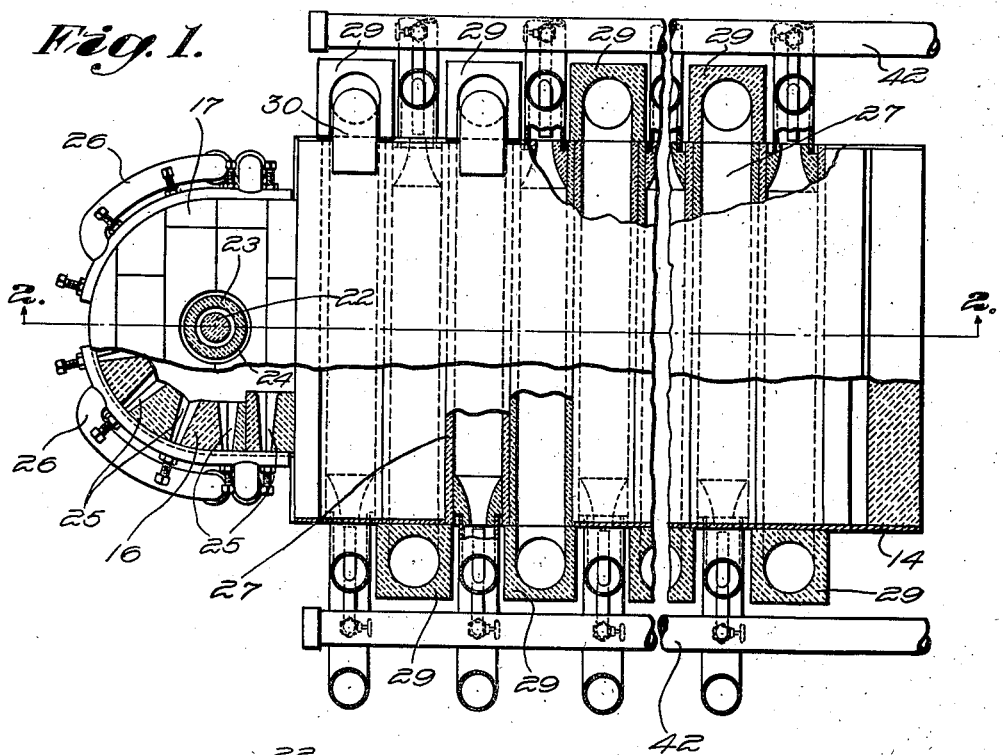
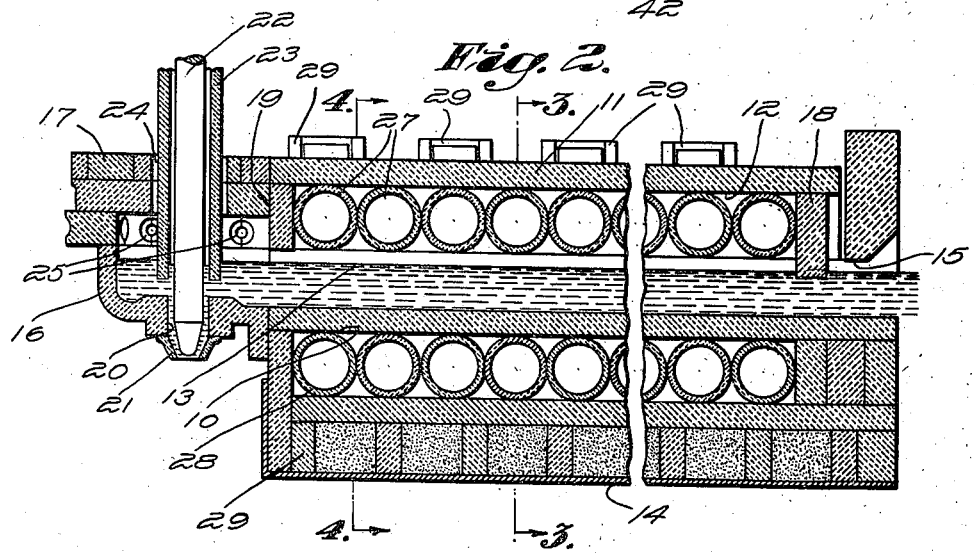

May 12, 1942.   W. T. BARKER, JR   2,282,554
APPARATUS FOR AND METHOD OF REGULABLY CONTROLLING THE
TEMPERATURE OF MOLTEN GLASS IN FOREHEARTHS
Filed Nov. 1, 1939    2 Sheets-Sheet 2
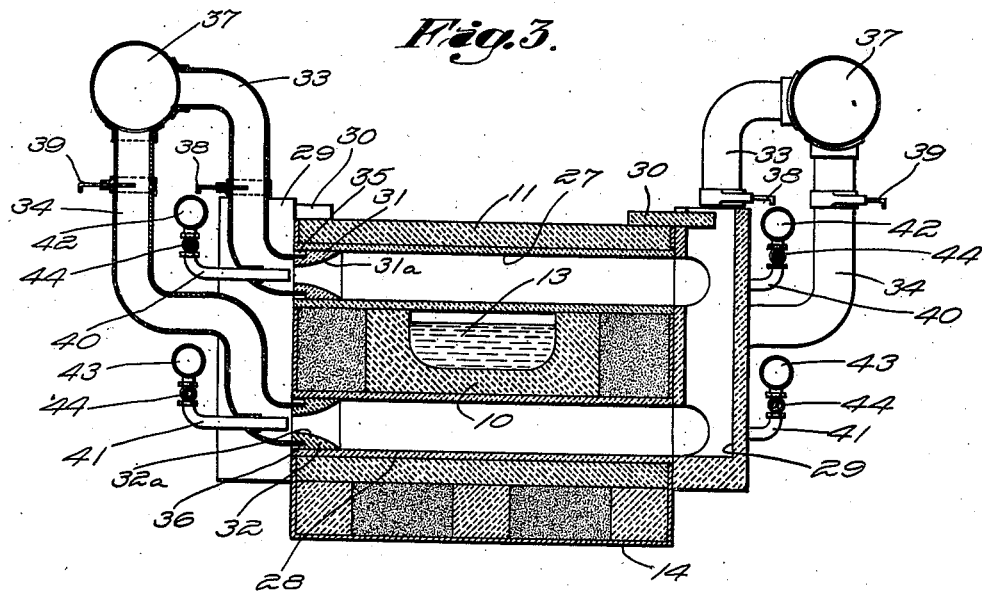
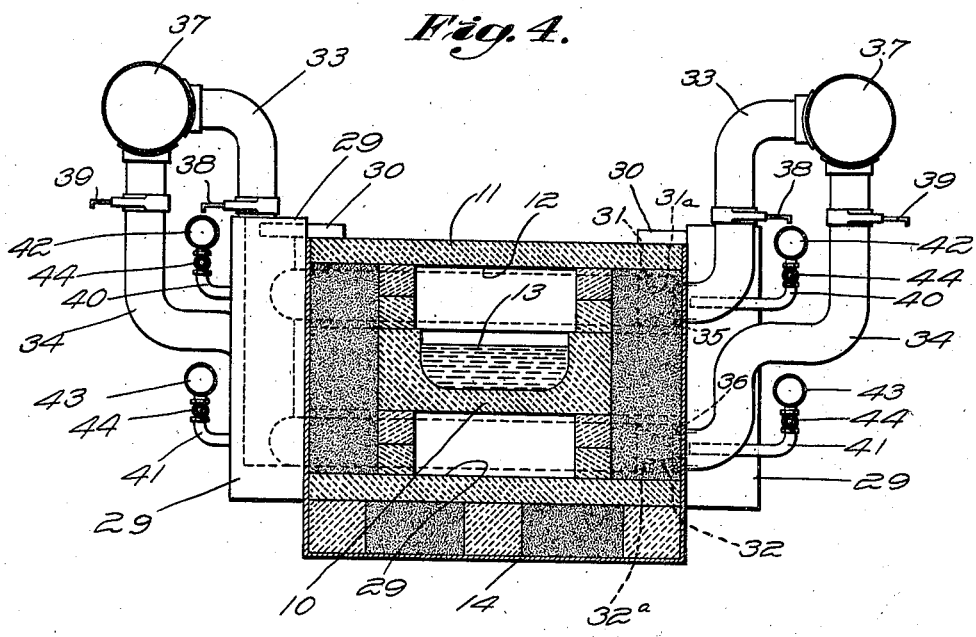
Witness
W. B. Thayer
Inventor
William T. Barker Jr.
By Brown & Parham
Attorneys Patented May 12, 1942

2,282,554

UNITED STATES PATENT OFFICE 2,282,554

APPARATUS FOR AND METHOD OF REGULABLY CONTROLLING THE TEMPERATURE OF MOLTEN GLASS IN FOREHEARTHS

William T. Barker, Jr., West Hartford, Conn., assignor to Hartford-Empire Company, Hartford, Conn., a corporation of Delaware Application November 1, 1939, Serial No. 302,350

6 Claims. (Cl. 49—54)

This invention relates to the improvements in apparatus for and methods of controlling the temperature of molten glass in forehearths, and it consists in the combinations, constructions and arrangements and in the steps hereinafter described and claimed.

An object of the invention is to provide for regulable control of the temperature of the molten glass in a forehearth without subjecting the molten glass to the idrect action of flames or heated products of combustion or other externally applied temperature regulating fluid medium.

Another object of the invention is to provide for regulable control of the temperature of molten glass in a forehearth in such a manner as to practically prevent or reduce to a minimum uncontrolled air currents in the space above the glass in the forehearth.

A further object of the invention is to provide for regulation of the temperature of the glass in the forehearth by the application of separately controllable temperature regulating influences to the surface and bottom portions of such glass.

A further object of the invention is to provide for regulable control of the temperature of the glass in a forehearth by such means and in such a manner as to exert an independently controllable temperature regulating influence on said glass in each of a series of zones which extend transversely of the forehearth above the glass therein and in each of a series of zones which extend transversely of the forehearth beneath the glass therein.

A further object of the invention is to provide for a wide range of selection of heating and cooling influences applicable to the glass in a forehearth from above and/or below such glass and at various places along the length of such forehearth.

A further object of the invention is to provide novel means for and a novel way of regulating the temperature of molten glass in a forehearth by either heating or cooling such glass from above or below in separately controllable zones which extend transversely of the forehearth.

Other objects and advantages of the invention will hereinafter be pointed out or will become apparent from the following description of a practical embodiment of the invention as illustrated in the accompanying drawings, in which:

Fig. 1 is a plan view of a forehearth equipped with means for regulably controlling the temperature of the glass therein in accordance with the present invention, portions of the upper structure of the forehearth being broken away to reveal underlying parts, some of which are shown in section;

Fig. 2 is a longitudinal vertical section through the forehearth, the view being taken substantially along the line 2—2 of Fig. 1;

Fig. 3 is a transverse vertical section through the forehearth, taken along the line 3—3 of Fig. 2; and Fig. 4 is a view similar to Fig. 3 but taken along the line indicated at 4—4 in Fig. 2.

In carrying out the present invention, I provide series or rows of parallel closely adjacent transversely extending temperature regulating passages both above and below the glass in a forehearth. Each of these passages may have walls of good thermal conductivity and each may be provided with an associate mechanism whereby either a heating medium, such as flames and heated gases of combustion, or a cooling medium, such as air at room temperature, may be passed therethrough at the will of the operator and the heating or cooling effect on the glass of the particular medium employed at any given time likewise regulated within a considerable range, also at the will of the operator. Innumerable combinations of different temperature regulating influences on the glass thus are available to provide a control of great flexibility and extent.

The forehearth shown in the drawings has a glass conducting conduit which comprises a lower glass supporting refractory channel member 10 and a refractory upper or cover member 11. As best seen in Fig. 4, the channel member 10 and the cover member 11, respectively, are of a substantially U-shape and inverted U-shape in cross-section and the legs of the upper or cover member 11 rest upon the upstanding legs of the channel member 10. A space 12 of substantial height may exist in the forehearth conduit above the stream of molten glass 13 in the channel member 10.

The forehearth conduit, comprising the channel member 10 and its cooperative cover member 11, may be supported within an outer metallic casing 14 from which it may be spaced and insulated by suitable refractory and insulating blocks and material in accordance with any suitable or preferred known practice in the art of building forehearths for molten glass. The arrangement preferably is such as to obviate as fully as possible unintended loss of heat from the glass in the forehearth to and through the outer metallic casing.

The forehearth conduit, thus encased, is in practice connected with a glass melting tank (not shown), so that molten glass from the tank may flow through an opening, indicated at 15, Fig. 2, into and through the forehearth channel to a glass delivery spout or bowl 16 at the outer end of such channel. The glass delivery spout or bowl may be attached to or associated with the forehearth channel in any suitable known way and by any suitable known means and it may be provided with a suitable cover structure, indicated at 17, Figs. 1 and 2.

The space above the glass in the forehearth channel may be separated from the space above the glass in the opening 15 between such channel and the supply tank by a transverse refractory separator 18. The space above the glass in the forehearth channel may be partially or completely separated at its outer end from the space above the glass in the delivery bowl or spout. As shown, Fig. 2, it is partially separated therefrom by a transversely extending refractory separator 19.

The delivery bowl or spout may have a feed outlet 20 in its bottom, terminating at its lower end in an orifice ring 21. Feeding of glass through this outlet may be effected under the control of any suitable feed controlling mechanism, one type of which includes a refractory plunger 22 and a refractory tube 23 as partially shown in Figs. 1 and 2. The plunger 22 and tube 23 are shown in Fig. 2 as depending through a suitable opening 24 in the cover structure for the feed spout of the bowl.

The side walls of the cover structure 17 are shown, Figs. 1 and 2, as being provided with a plurality of radial ports 25 to which a suitable combustible mixture may be supplied by an associate fuel supply system, portions of which are indicated at 26 in Fig. 1. The particular structural arrangements shown in Figs. 1 and 2 for supplying heat to the space above the glass in the feed bowl or spout are substantially as disclosed in detail in Patent No. 2,139,770, granted December 13, 1938, to Karl E. Peiler, and the present applicant jointly. The waste products of combustion may be vented through the space between the tube 23 and the wall of the opening 24.

The forehearth structure, as described thus far, forms no part of the present invention and may vary widely in details from that shown and be provided with known structural parts and appurtenances according to preference or specific requirements for any particular service.

In carrying out the present invention, I may provide in the space 12 above the glass 13 a series of transversely extending tubes 27, which may be made of alundum or any other suitable refractory material having high heat conducting properties. These tubes 27 provide the aforementioned upper transverse temperature regulating passages. They are shown as being circular in cross section and as being located in contiguous, parallel relation with one another in a series that extends from the front transverse separator 19 to the rear separator 18.

The end portions of the tubes 27 extend through the side walls of the forehearth conduit and the intervening spacing and insulating material between such conduit and the metallic outer casing 14 into suitable openings in the latter, as best seen in the illustration of one of the tubes 27 in Fig. 3.

A similar series of transversely extending tubes 28 is provided beneath the bottom of the forehearth channel 10. In the particular embodiment of the invention shown, these tubes 28 are located in a temperature regulating space or chamber 29 that is provided directly beneath the forehearth channel in the intervening structure between that channel and the outer casing 14. The tubes 28, like the tubes 27, extend to and through suitable openings in the side walls of the outer casing, as shown for one of the tubes in Fig. 3.

Corresponding tubes 27 and 28 of the upper and lower series may be located with their center lines in the same vertical plane. They may be located in staggered relation or out of vertical alignment. The ends of corresponding tubes of the two series at one side of the forehearth communicate with a vertically disposed stack or flue 29. As shown, this stack 29 has been formed integral with the adjacent end portions of the vertically aligned tubes 27 and 28 which it is to serve. However, it is obvious that the stack may be formed as a separate member, and suitably connected with these tubes and supported at the side of the forehearth casing in any suitable known way. Each stack may be controlled adjacent to its open upper end by a damper 30.

The tubes 27 and 28 may be provided at their ends which are opposite from their stack-communicating or outlet ends with reducing bushings, indicated at 31 for the tubes 27 and at 32 for the tubes 28. These reducing bushings preferably are shaped internally so as to constitute Venturi passages, designated 31a and 32a, respectively. Pipes indicated at 33 and 34, respectively, are connected with these intake end portions of the tubes 27 and 28. As shown (see Figs. 3 and 4) ends of the pipes 33 and 34 fit onto externally reduced or counterbored outer end portions 35 and 36 of the bushings 31 and 32 respectively.

The pipes 33 and 34 may supply a gaseous medium to the tubes 27 and 28, as for example, cooling air from a manifold or common supply pipe 37. A fan, not shown, or other pressure inducing means may be provided in connection with the manifold 37 to force such gaseous medium through the pipes 33 and 34 into and through the tubes 27 and 28 to their exhaust stacks 29. Each of the pipes 33 and 34 may be provided with a separate control valve or damper, as indicated at 38 for the pipe 33 and at 39 for the pipe 34.

Each of the tubes 27 and 28 also is provided at its intake end with a separate means for passing a heating medium, such as flames or heated products of combustion, therethrough. As best seen in Figs. 3 and 4, similar heating medium or fuel delivery pipes or nozzles 40 and 41, respectively, lead through suitable openings in the walls of the pipes 33 and 34 to the intake ends of the Venturi passages in the bushings 31 and 32, respectively. These pipes or nozzles 40 and 41 may be connected with heating medium or fuel supply manifolds 42 and 43, respectively. Each pipe or nozzle 40 or 41 may be provided with an individual separately controllable valve 44.

As best shown in Fig. 1, adjacent pairs of upper and lower tubes 27 and 28 have their intake and exhaust end portions reversed so that the stacks 29 for adjacent pairs of upper and lower tubes respectively are located at opposite sides of the forehearth as are the means just described for selectively supplying cooling or heating media to such tubes.

From the foregoing description of a practical embodiment of the invention, the operation thereof will be readily understood. The separate heating and cooling provisions permit either a cooling gaseous medium or a heating medium to be supplied at will to each of the transversely extending tubes of either the upper or lower series. The controls described permit independent adjustments of the volumes and effects of these media in the several tubes or transverse passages and also further adjustments of the effects of the media in pairs of vertically aligned upper and lower tubes by regulation of the common adjustable exhaust means therefor. Innumerable combinations of heating and/or cooling influences on the glass in the forehearth may be employed to secure the desired temperature regulating result under practically any service conditions that may be encountered. In general, the result sought is the establishment of a predetermined desirable temperature uniformly throughout the entire cross section of the stream of glass in the forehearth channel by the time such glass reaches the feed bowl or spout or delivery chamber. It is within the purview of the invention to make use of any combination of the temperature regulating influences on the glass that the invention provides to produce this result or any other regulation of temperature of the glass that may be desired in any particular instance.

Each of the transverse temperature regulating passages has the advantage of tending to produce a substantially uniform temperature regulating effect on the glass stream throughout the width of that stream, either from below or above according to the location of the particular passage. Since the several passages of each of the upper and lower series are independently controllable, the total temperature regulating influences on the glass of both the upper and lower series are variable at will in zones extending longitudinally of the forehearth. Either the upper or lower series of passages may be used alone or any desired number of the passages of either of such series may be used at any given time. Heating and cooling media may be passed alternately through all or certain of the passages of either or both the series or adjacent passages of either or both the series may be used as heating and cooling passages respectively. Certain of passages of either series, as, for example, those nearest the intake end of the forehearth, may be used as cooling passages and the remainder as heating passages. These are but a few of the many different combinations of temperature regulating effects which may be obtained by the use of the invention.

It is obvious that the transverse temperature regulating passages may be provided by the use of refractory tubes of other than circular configuration in cross section or otherwise than by the use of separate tubes for the individual passages, as in refractory blocks. Also, the regulably controllable means for supplying heating and/or cooling media to and for exhausting the same from the transverse passages may vary in details of construction and operation from the particular means shown in the drawings without departing from the spirit and scope of the invention.

What I claim is:

1. In a forehearth, a flow channel for molten glass, a series of transversely extending passages located above the channel in heat exchanging relation with a stream of glass therein, a series of transversely extending passages located beneath the flow channel in heat exchanging relation with the bottom of said channel, individual passages of said first named series respectively being vertically aligned with individual passages of said second named series, and means for passing temperature influencing media in opposite directions through adjacent passages of each of said series and in the same direction through vertically aligned passages of the two series.

2. In a forehearth, a flow channel for molten glass, a series of transverse passages located above the flow channel in heat exchanging relation with a stream of glass in said channel, a series of passages located beneath said channel in heat exchanging relation therewith, individual passages of said first named series respectively being vertically aligned with individual passages of said second named series, separately controllable conduits connected with corresponding ends of vertically aligned passages of said first named and second named series, respectively, for supplying cooling fluid thereto, separately controllable fuel supply pipes located in positions to discharge combustible fuel into the same ends of said vertically aligned passages of the two series, and exhaust means connected with the opposite ends of said vertically aligned passages of said two series.

3. In a forehearth, a flow channel for molten glass, a series of transverse passages located above the flow channel in heat exchanging relation with a stream of glass in said channel, a series of passages located beneath said channel in heat exchanging relation therewith, individual passages of said first named series respectively being vertically aligned with individual passages of said second named series, separately controllable conduits connected with corresponding ends of vertically aligned passages of said first named and second named series, respectively, for supplying cooling fluid thereto, separately controllable fuel supply pipes located in positions to discharge combustible fuel into the same ends of said vertically aligned passages of the two series, and exhaust means connected with the opposite ends of said vertically aligned passages of said two series, the cooling fluid and fuel supply means of each pair of vertically aligned passages of the two series being located at the same side of the flow channel as the exhaust means of the adjacent pair of vertically aligned passages, and vice versa.

4. The method of regulating the temperature of a stream of molten glass in a forehearth channel which comprises passing a series of parallel streams of heating media transversely to the direction of flow of the glass in said channel out of contact but in heat exchanging relation with said glass, and independently controlling each of said streams of heating media to vary at will the temperature regulating effect thereof on glass in the forehearth channel.

5. The method of regulating the temperature of a stream of molten glass in a forehearth channel which comprises passing series of transversely extending streams of heating media above and below said forehearth channel in heat exchanging relation with the glass therein, and independently controlling the respective streams of temperature influencing media to predetermine the temperature regulating effect thereof on glass in the forehearth channel.

6. The method of regulating the temperature of a stream of molten glass in a forehearth channel which comprises passing temperature influencing media in one direction extending transversely of the forehearth in pairs of vertically aligned paths respectively extending transversely above and transversely below the forehearth channel in heat exchanging relation with the glass in said channel and passing temperature influencing media in the opposite direction transversely of the forehearth in pairs of vertically aligned paths respectively extending transversely above and transversely below the forehearth channel in heat exchanging relation with the glass in said channel and located in alternating relation with said first named pairs of vertically aligned paths.

WILLIAM T. BARKER, Jr.